H. S. DAVIS AND R. F. BACON.
PROCESS AND APPARATUS FOR MELTING SULPHUR.
APPLICATION FILED AUG. 13, 1921.
1,421,416.
Patented July 4, 1922.
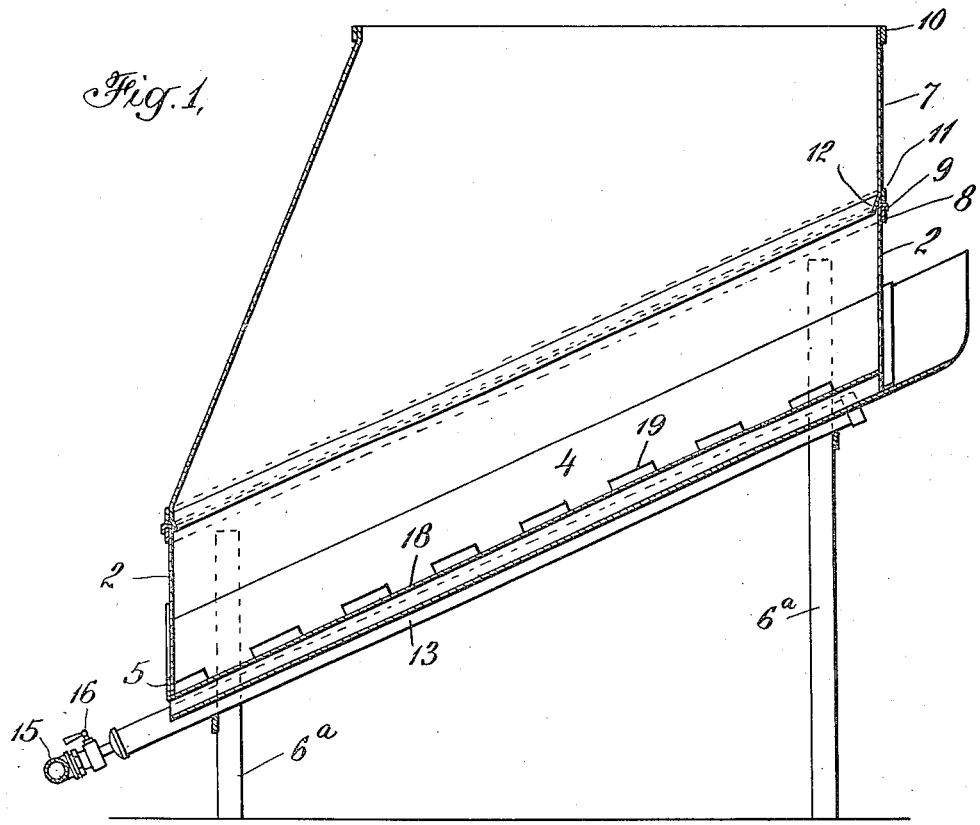
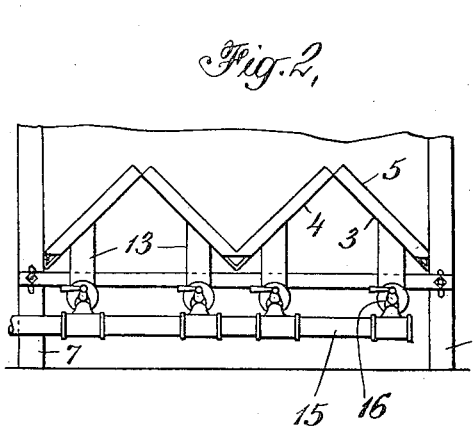
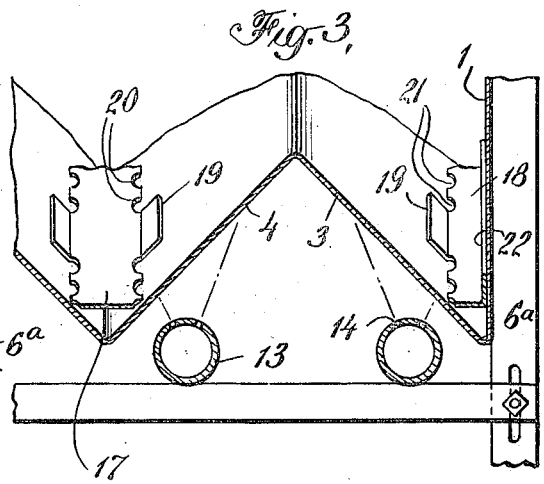
INVENTORS
H. S. Davis
R. F. Bacon
BY
ATTORNEYS

UNITED STATES PATENT OFFICE.

HAROLD S. DAVIS AND RAYMOND F. BACON, OF PITTSBURGH, PENNSYLVANIA, ASSIGNORS TO TEXAS GULF SULFUR COMPANY, OF BAY CITY, TEXAS, A CORPORATION OF TEXAS.

PROCESS AND APPARATUS FOR MELTING SULPHUR.

1,421,416.  Specification of Letters Patent.  Patented July 4, 1922.

Application filed August 13, 1921. Serial No. 491,914.

*To all whom it may concern:*

Be it known that we, HAROLD S. DAVIS, a subject of the King of Great Britain, and RAYMOND F. BACON, a citizen of the United States, both residing at Pittsburgh, county of Allegheny, State of Pennsylvania, have invented certain new and useful Improvements in Processes and Apparatus for Melting Sulphur; and we do hereby declare the following to be a full, clear, and exact description of the invention, such as will enable others skilled in the art to which it appertains to make and use the same.

Our invention is an improvement in a process and an apparatus for melting sulphur. In the melting of sulphur, in order that the process be quick and economical, it is necessary that the heat be applied as directly as possible to the solid crystals, without the intervention of liquid sulphur. The actual amount of heat required to melt the sulphur is small, but the sulphur whether solid or liquid is a very poor conductor of heat. Hence, it is desirable that the melted sulphur be removed as quickly as possible, to avoid overheating of the same, and to facilitate the melting of the solid sulphur. Sulphur when heated above a certain temperature increases in viscosity to such an extent that it flows with difficulty, and a non-conducting layer of very viscous sulphur is formed between the source of heat and the solid sulphur. In the usual method of melting sulphur, in kettles, with agitation, that is with the solid sulphur in contact with the melted, it is practically impossible to avoid local overheating, and consequent inefficiency in utilization of the heat supply, because of the low specific heat of liquid sulphur. At the temperature when the sulphur becomes viscous, which is about 50° C. above its melting point, it becomes so thick that it can be stirred only with difficulty, and this property increases until the temperature is raised about twenty additional degrees. That is when the sulphur becomes viscous through overheating, it must be heated almost to the boiling point before it is again mobile. Should the sulphur contain traces of oil or other organic substances, interaction will result before such temperature of mobility is reached, causing discoloration and evolution of noxious gases. For many purposes, as for instance making sulfur-sand mixtures, overheating of this kind is undesirable.

The object of the present invention is to provide a process, and an apparatus for carrying out the process for obtaining liquid sulphur, from the solid, at any desired temperature, wherein the solid sulphur is brought to the melting point and converted into liquid at as low a temperature as possible, and the liquid sulphur is removed as soon as formed, after which it may be heated to the temperature desired with suitable agitation.

In the drawings:

Figure 1 is a longitudinal vertical section through the improved apparatus,

Figure 2 is a partial end view looking from the lower end,

Figure 3 is a partial transverse vertical section.

In the present embodiment of the invention a melting chamber or retort is provided, consisting of side walls 1, end walls 2 and an integral bottom which is composed of series of planes 3 and 4 arranged in inclined position, to provide troughs extending from one end of the bottom to the other. The members of the series 3 and 4 of planes alternate, the members of each series being parallel and meeting the members of the other series at an angle of approximately 90°. Both side walls and bottom of the retort are of suitable metal, as for instance aluminum, which is not attacked by sulphur near the melting point, and which is an excellent conductor of heat. The planes 3 and 4 have flanges 5 at their ends, which lap upon the ends walls 2, and are secured thereto in any suitable manner. The retort is supported by pairs of legs 6 and 6ª, the legs 6 being longer than the legs 6ª, and the retort is supported with the bottom inclining at an angle of approximately 30° to the horizontal. The inclines 3 and 4 since they meet each other at right angles, are inclined at angles of 45°, to the horizontal, and the outermost inclines of the series meet the side walls 1 at angles of 45°. The end walls 2 are parallel, and are vertical, as shown, and the bottom at the upper end of the retort is extended beyond the adjacent end wall 2, as clearly shown in Figure 1. The retort is completed by a species of hopper 7 of any suitable material, as for instance galvanized iron, which is seated on the side and end walls 1 and 2 of the retort. Referring to Figure 1, it will be seen that the walls of the hopper at the lower end thereof are slightly flanged to engage within the side and end walls of the retort. The upper edges of the side and end walls of the retort are reinforced by a ring 8, and the side and end walls are flanged outwardly and bent down upon the outer face of the ring, as indicated at 9. The ring is riveted to the side and end walls, and similar rings 10 and 11 are riveted to the top and bottom of the hopper 7. The hopper 7 flares toward the bottom as shown, and the inwardly turned flange 12 at the bottom of the hopper deflects all of the sulphur inwardly into the retort. A heating pipe 13 for fluid fuel is arranged beneath each incline 3 and 4, and each of the heating pipes is inclined to extend parallel with the bottom of the retort. The heating pipes have openings 14 at their upper sides for the escape of the fuel, and they are spaced at their nearest point approximately 1″ from the inclines 3 and 4. The pipes 13 are connected by a header 15 at their lower ends, and a suitable valve 16 is provided for controlling each pipe. The header 15 may be connected with a suitable source of fuel supply, as for instance a gas line. The burning fuel issuing from the pipes 13 impinges upon the under faces of the inclines intermediate their top and bottom edges, and preferably about 2″ from the bottoms of the said inclines. Near the lower edge of each incline, between adjacent inclines, and between the inclines and the side walls 1 of the retort, baffles 17 and 18 are arranged. Each of these baffles is in the form of a strip of aluminum, having extensions 19 which lap upon the upper faces of the inclines 3 and 4, and are secured thereto. The strips are laid in the bottoms of the gutters formed between the inclines, and between the inclines and the side walls 1 of the retort, just below the point where the burning fuel impinges upon the inclines. Each strip 17 has notches or recesses 20 in its opposite side edges, and each strip 18 has similar notches or recesses 21 in one edge for permitting the melted sulphur to flow to the bottoms of the troughs. The baffles however, restrain the movement of the solid sulphur, so that there is always a free passage for the sulphur as it melts, through the notches 20 into the gutters, from whence it may flow to any desired point. At the opposite edge from the notches 21, the strips 18 have flanges 22 which are secured to the side walls 1 of the retort. The improved apparatus comprises essentially means for progressively feeding the solid sulphur into the melting zone, and removing the melted sulphur as it forms.

The means for progressively feeding the sulphur is the incline 3 or 4. The heating zone is provided intermediate the tops and bottoms of the inclines by the heaters 13, and the means for removing the melted sulphur as it forms is the trough formed between the inclines. As the solid sulphur melts, it flows down through the notches 20 into the gutters, and there is no danger of overheating, since it is removed as soon as it melts. Neither does the melted sulphur interfere with the heating of the solid sulphur since it is removed as it forms. The element 7 is merely a means for preventing the spilling of the unmelted sulphur, and for causing the full weight of the sulphur to rest upon the inclined bottom of the retort. The spacing of the heating means above the bottoms of the gutters prevents any superheating of the sulphur in the gutters, and the baffles prevent the solid sulphur from obstructing the flow of the liquid. In practice the average temperature of the sulphur as it runs from the melter will be about 140° C. This is the most suitable temperature at which to handle liquid sulphur, because it is far enough above the freezing point to avoid local solidification, and far enough below the temperature of sudden increase of viscosity, so that there is no danger of loss of mobility. At this temperature oxidation of the sulphur is slight, and the fumes are not serious. Since there is little reaction over short periods between sulphur and organic impurities which it may contain, there is practically no odor of hydrogen sulfide, and the sulphur may be remelted without much discoloration. Liquid sulphur at such temperature may be transported long distances in unjacketed pipes, carrying a small steam line, and it may be kept indefinitely in steam jacketed vessels. A pressure of twenty-five pounds per square inch on the steam line is sufficient. The improved melter is simple and inexpensive, and production starts a few moments after the heat is applied, stopping as soon as the heat is withdrawn. The sulphur can be fed in at the top in any desired manner, and apart from such feeding the sulphur needs no attention.

We claim.

1. The process of melting sulphur, which comprises providing a surface heated to the melting temperature of the sulphur, progressively feeding the solid sulphur against said surface in such manner that only that portion of the sulphur at the said surface is heated to the melting point of the sulphur, and removing the melted sulphur as it forms.

2. The process of melting sulphur, which comprises progressively feeding the solid sulphur over an inclined metallic surface, heating a portion of said surface to the melting point of the sulphur, and restraining the movement of the solid sulphur beyond such portion of the surface while permitting free flow of the melted sulphur.

3. The process of melting sulphur, which comprises feeding the solid sulphur along an inclined surface, heated intermediate its top and bottom to the melting point of the sulphur whereby to melt the same as the sulphur passes such point, and restraining the movement of the solid sulphur at such point while permitting the flow of the liquid sulphur.

4. The process of melting sulphur, which comprises progressively feeding the solid sulphur to a heating means for melting the sulphur, separating the solid from the melted sulphur at the heating means, and permitting the melted sulphur to flow away from the heating means.

5. A device of the class described, comprising a retort having a plane inclined bottom, heating means intermediate the top and bottom of the plane, and means for holding the solid sulphur from moving past the heating means and for permitting the free flow of the liquid sulphur.

6. In a device of the class described, a retort having a bottom composed of a series of inclined planes, heating means intermediate the top and bottom of each plane, means for holding the solid sulphur from moving past the heating means while permitting the liquid sulphur to pass freely, and means at the bottom of each plane for carrying away the melted sulphur.

7. A device of the class described, comprising a retort having a plane inclined bottom, heating means intermediate the top and bottom of the plane, means for holding the solid sulphur from moving past the heating means and for permitting the free flow of the liquid sulphur, and means at the bottom of the plane for carrying away the melted sulphur.

8. In a device of the class described, a retort having a bottom composed of a plurality of troughs inclined downwardly towards one end of the retort, means near the bottom of each trough for holding the solid sulphur from the said bottom, and heating means for melting the sulphur at each of the said holding means.

9. In a device of the class described, a retort having an inclined bottom formed by a plurality of troughs, means for heating the walls of the troughs between the tops and bottoms thereof, and means for preventing the solid sulphur from reaching the bottoms of the troughs.

In testimony whereof we affix our signatures.

HAROLD S. DAVIS.
RAYMOND F. BACON.